Figure 1:
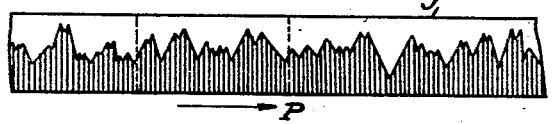

Feb. 18, 1930.  A. POULSEN ET AL  1,747,261
SOUND REPRODUCTION
Filed Aug. 17, 1926

Inventors:
Arnold Poulsen
and Axel Carl Georg Petersen
By

Attorney.

Patented Feb. 18, 1930

1,747,261

UNITED STATES PATENT OFFICE

ARNOLD POULSEN AND AXEL CARL GEORG PETERSEN, OF COPENHAGEN, DENMARK

SOUND REPRODUCTION

Application filed August 17, 1926, Serial No. 129,830, and in Germany September 3, 1925.

It is well known to reproduce sounds that are recorded on a photographic film, by lighting a light-sensitive cell through the phonogram recorded on the film, the latter being kept in uniform motion. Similarly it is known to effect such reproduction of sounds by forming an enlarged optical image of the phonogram on the light-sensitive cell proper or on a slit disposed in front of the same, the said image extending, during the motion of the film, across the cell or slit, whereby a variation of the lighting of the cell in accordance with the recorded sound will be effected.

The object of forming thus an enlarged phonographic image in front of the said slit or on the light-sensitive cell is to facilitate the adjustment of the slit or the cell, and to render practicable the use of a not altogether too narrow slit or cell. The width, in fact, should preferably not exceed half the width of a period corresponding to the highest periodicity occurring in the phonographic image, in order not to impair the purity of the sound to be reproduced.

It follows, however, from the previously proposed method of producing an ordinary enlarged photographic image, i. e. an image in which the phonogram appears uniformly enlarged in longitudinal as well as in lateral direction, that when the degree of enlargement best suited to the above mentioned object is selected, then the height of the sound graphs parallel to the longitudinal direction of the light-sensitive cell will be so large that it will become difficult, or even impossible, to manufacture correspondingly long light-sensitive cells of accurately linear form. This applies especially to selenium cells. The use of linear cells, however, especially in case of direct lighting of the cell, is a condition which is necessary in order to attain an accurate reproduction of sound.

The present invention has for its object to render practicable the enlargement of a phonogram to a degree sufficiently high to fulfill the above mentioned requirements, without difficulties being created thereby in respect to the manufacture of a linear light-sensitive cell suitable for the reproducing process, and according to the invention the said object is to be attained by the formation on the said slit or light-sensitive cell of an image of the phonogram which is distorted on account of the unequal enlargement of the same in longitudinal and lateral direction. The enlargement in lateral direction is selected independently of the enlargement in longitudinal direction, but in accordance with the length of the light-sensitive cell, while the enlargement in longitudinal direction is selected solely in accordance with the width of the cell or the slit.

These mutually independent enlargements of two dimensions perpendicular to one another may be effected by means of two cylinder lenses, the geometrical axes of which are at right angle to one another, or by means of a condensing lens and a cylinder lens the axis of which is parallel to the plane of the condensing lens.

The drawing illustrates two different embodiments of the invention, although a number of other constructions come within the scope of the invention.

Figure 2:
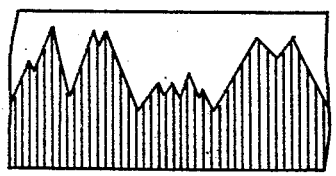
Figure 3:
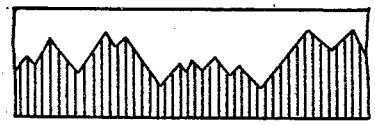

Fig. 1 shows a phonogram recorded on a film,

Fig. 2 a view of a portion of a similar phonogram in ordinary enlargement,

Fig. 3 a distorted enlarged view of the same, and

Figure 4:
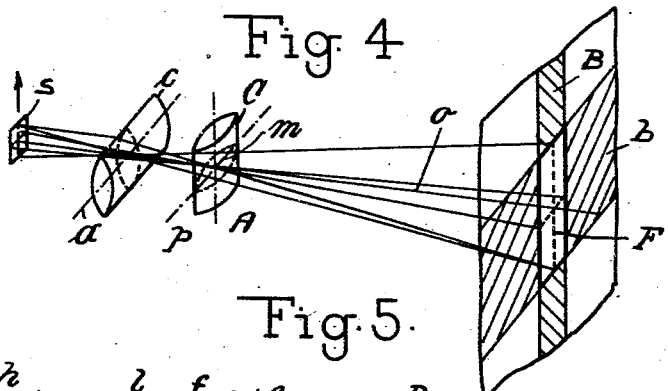
Figure 5:
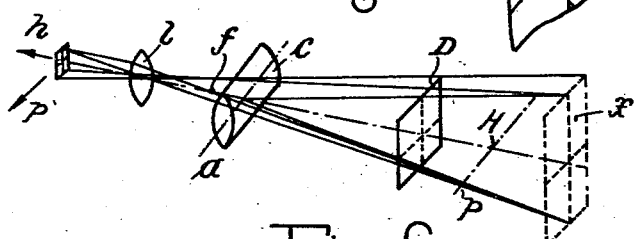
Figure 6:
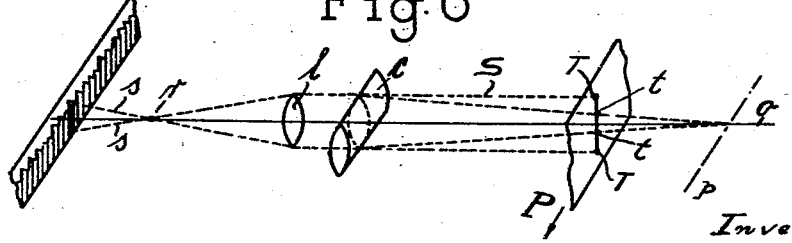
Figure 6:
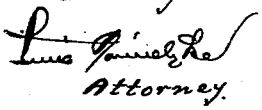

Figs. 4, 5 and 6 show various optical systems adapted to produce the image shown in Fig. 3.

In Fig. 1 the cross-hatched surface represents a phonogram recorded on a film $f$, and Fig. 2 shows an enlargement of the portion of the phonogram enclosed between the dotted lines in Fig. 1, viz, in the shape in which it heretofore has been proposed to use an enlarged optical image of the phonogram for reproduction of sound. This enlarged image is of precisely the same shape as the phonogram proper.

Fig. 3 shows by way of example the shape of the same portion of the phonogram when enlarged in the manner aimed at by the invention. As will be apparent from Figs. 3 and 1, the abscissæ of the phonogram are enlarged considerably more than the ordinates, in such a manner that there will be no geometrical similarity between the phonogram and the image of the same.

An enlargement of this kind may be effected in the manner shown by way of example in Figs. 4 and 5. In these figures, $s$ is a segment of the phonogram, and P the direction of motion of the same during the reproduction of sound, cf. Fig. 1.

In Fig. 4 $c$ and C are two cylinder lenses, the geometrical axes $a$ and A of which are at right angles to one another. The lenses $c$ and C form together an optical system with optical axis $o$. The relative distance of the lenses $c$ and C, the focal lengths of the same, and the distances of the lenses from the segment $s$ are chosen in such a manner that the images formed by the lenses $c$ and C separately, viz, $b$ and B, will be located in one and the same plane at right angles to the optical axis. In the example shown the focal axis $p$ of the lens $c$ passes through the optical centre $m$ of the lens C. It is a well known fact that cylinder lenses do not collect in a sharp formation of image the light-rays lying in one and the same plane parallel to the geometrical axis of the lens, but mainly have no effect on the relative directions of such light-rays during their passage through the lens. Therefore each of the individual lenses $c$ and C will mainly form an image only in one direction, viz, at right angles to the axis $a$ or A of the lens concerned. There will therefore be formed a sharply defined image of the segment $s$, viz, determined by the portion F which is common to the two images $b$ and B. In this image, however, the heights will appear on an enlarged scale depending on the focal length of the lens C and the distance of the latter from the segment $s$, while the width of the image will appear enlarged to a different degree, depending on the focal length of the lens $c$ and the distance of the latter from the segment $s$. By suitable selection of the focal lengths of the lenses $c$ and C and the distances of the same from the segment, any desired enlargement of the heights of the sound graphs of the phonogram may be attained, independently of the simultaneously attained enlargement of the widths of the graphs.

In Fig. 5, a condensing lens $l$ with focus $f$ and a cylinder lens $c$ are used instead of two cylinder lenses. Disregarding the presence of the cylinder lens $c$, the condensing lens $l$ would form an image $x$ of the segment $s$ uniformly enlarged in all directions. The cylinder lens $c$, however, the focal axes of which pass through the points $h$ and H of the line $o$, will cause the formation, between the lens $c$ and the focal axis $p$ of the same, of an image D, instead of the said image $x$, which image D is smaller than image $x$.

In the image D, in fact, the dimensions of the phonogram at right angles to its direction of motion, i. e. the heights of the graphs, will appear on a smaller scale than in the image $x$.

The cylinder lens $c$ does not cause any deviation, in direction parallel to its axis $a$, Fig. 5, of the light-rays coming from the lens $l$, and consequently the lens $c$ will actually not alter the dimensions of the phonogram image $x$ in the direction P. These dimensions, however, will appear slightly reduced in the image D, because the latter is formed nearer to the lens $l$ than the image $x$. In the image D, however, these individual sound-graphs will not be sharply defined in the longitudinal direction, because the plane of image D is situated outside of the image plane $x$ of the lens $l$, in such a manner that in the image D the limitation of the sound graphs formed by lens $l$ will not appear sharply defined in longitudinal direction. A slight lack of sharpness, however, will not be of essential importance, especially when the arrangement is made in such a manner that the lack of sharpness is present not in the limits of the sound-graphs in the longitudinal direction of the phonogram, but in the limits of the same in transverse direction. An arrangement of this nature is shown in Fig. 6, where the cylinder lens is placed in such a manner that its focal axis $p$ comes outside of the plane of image $x$. In this case the cylinder lens $c$ will deflect the light-rays S coming from the lens $l$ in inward direction, i. e. towards the optical axis $o$, so that in the image plane $x$ the transverse dimensions will not appear on a scale T—T corresponding to the enlargement produced by the lens $l$, but, owing to the presence of the lens $c$, on a reduced scale $t$—$t$. The limitation of the dimensions $t$—$t$ is not sharply defined due to the fact that the plane $x$ is not the exact optical image-plane of the optical system comprising both of the lenses $l$ and $c$, but $x$ is the optical image plane of the individual lens $l$, and for this latter reason the dimension of the sound sign in longitudinal direction will appear sharply defined in the image $x$.

Having now fully described and ascertained our said invention and the manner in which it is to be performed, we declare that what we claim is:—

1. A process of reproducing sounds recorded photographically on a film, comprising the steps of passing light through a moving phonogram and forming a distorted optical image thereof by dissimilar enlargement of the longitudinal and transverse dimensions of the sound-graphs of the phonogram, and illuminating through said image a light-sensitive cell inserted in a reproducing circuit.

2. A sound reproducing system, embodying a source of light for illuminating a moving film having a phonogram recorded thereon, a light-sensitive cell elongated transversely to the travel of the film, means interposed between the light source and the cell for forming across the said cell a distorted optical image of the phonogram by dissimilar enlargement of the longitudinal and transverse dimensions of the sound-graphs of the phonogram, and a reproducing circuit wherein the cell is inserted.

In testimony whereof they affix their signatures.

ARNOLD POULSEN.
    AXEL CARL GEORG PETERSEN.